United States Patent
Han et al.

(10) Patent No.: US 7,662,511 B2
(45) Date of Patent: Feb. 16, 2010

(54) SECONDARY BATTERY HAVING AN ENLARGED ELECTROLYTIC SOLUTION INLET

(75) Inventors: Su-Jin Han, Cheonan-si (KR); Chang-Seob Kim, Cheonan-si (KR); Yoon-Tai Kwak, Cheonan-si (KR); Soo-Youn Maeng, Incheon-si (KR); Ju-Hyung Kim, Cheonan-si (KR)

(73) Assignee: Samsung SDI Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1035 days.

(21) Appl. No.: 10/791,854

(22) Filed: Mar. 4, 2004

(65) Prior Publication Data

US 2004/0234846 A1    Nov. 25, 2004

(30) Foreign Application Priority Data

May 21, 2003    (KR)    ............ 10-2003-0032251

(51) Int. Cl.
   *H01M 2/00* (2006.01)
   *H01M 2/02* (2006.01)
   *H01M 10/00* (2006.01)
   *H01M 10/02* (2006.01)

(52) U.S. Cl. ............ 429/170; 429/163; 429/164; 429/167; 429/171; 429/178; 429/179

(58) Field of Classification Search ............ None
   See application file for complete search history.

(56) References Cited

U.S. PATENT DOCUMENTS

| | | | | |
|---|---|---|---|---|
| 4,421,832 | A * | 12/1983 | Uba ............ | 429/72 |
| 4,592,970 | A * | 6/1986 | Zupancic ............ | 429/82 |
| 4,735,630 | A * | 4/1988 | Planchat ............ | 429/70 |
| 2002/0012829 | A1 * | 1/2002 | Yamahira et al. ............ | 429/56 |
| 2003/0180582 | A1 * | 9/2003 | Masumoto et al. ............ | 429/7 |

FOREIGN PATENT DOCUMENTS

| | | | |
|---|---|---|---|
| DE | 3339933 A1 | * | 5/1985 |
| JP | 06096793 | * | 4/1994 |
| JP | 11-025936 | | 1/1999 |
| JP | 11-96987 | | 4/1999 |
| JP | 11-176418 | | 7/1999 |

(Continued)

OTHER PUBLICATIONS

IPDL JPO machine translation, JP2000-208130, published Jul. 28, 2000, retrieved on Jun. 27, 2008.*

(Continued)

*Primary Examiner*—Dah-Wei D Yuan
*Assistant Examiner*—Katherine Turner
(74) *Attorney, Agent, or Firm*—Robert E. Bushnell, Esq.

(57) ABSTRACT

A secondary battery includes an electrode unit having a first electrode plate, a second electrode plate, a separator interposed therebetween, and first and second electrode tabs respectively extending from the first and second electrode plates, a can adapted to accommodate the electrode unit and an electrolytic solution, and a cap plate adapted to seal the can and having an electrolytic solution inlet, wherein the electrolytic solution inlet has an area on one surface of the cap plate different from that on another surface of the cap plate.

29 Claims, 7 Drawing Sheets

FOREIGN PATENT DOCUMENTS

| | | | |
|---|---|---|---|
| JP | 2000-021437 | | 1/2000 |
| JP | 2000-156219 | | 6/2000 |
| JP | 2000208130 | * | 7/2000 |
| JP | 2001273884 A | * | 10/2001 |
| JP | 2001-313022 | | 11/2001 |
| JP | 2001313022 | * | 11/2001 |
| JP | 2002-358948 | | 12/2002 |
| JP | 2003-197179 | | 7/2003 |
| JP | 2004-119329 | | 4/2004 |
| JP | 2004-259584 | | 9/2004 |
| JP | 2004-296195 | | 10/2004 |
| KR | 2000-51285 | | 8/2000 |
| WO | WO03003485 | * | 1/2003 |

OTHER PUBLICATIONS

IPDL JPO machine translation of JP 2001273884 A, published Oct. 5, 2001, retrieved Dec. 8, 2008.*
IPDL JPO machine translation of JP06096793, published Apr. 8, 1994, retrieved Mar. 4, 2009.*
IPDL JPO machine translation of JP2001313022, published Nov. 9, 2001, retrieved Mar. 4, 2009.*
Chinese Office Action for Chinese Patent Application No. 200410032488.2, issued on Dec. 22, 2006.
*Office action* from the Japanese Patent Office issued in Applicant's corresponding Japanese Patent Application No. 2004-024398 dated Jun. 3, 2008.
Chinese Registration Determination Certificate issued by Chinese Intellectual Property Office on Jul. 22, 2009, in the corresponding to Chinese Patent Application No. 200410032488.2.

* cited by examiner

SECONDARY BATTERY HAVING AN ENLARGED ELECTROLYTIC SOLUTION INLET

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 21 May 2003 and there duly assigned Serial No. 2003-32251.

BACKGROUND OF THE INVENTION

1. Field of the Invention

The present invention relates to a secondary battery, and more particularly, to a secondary battery having an improved structure capable of easily injecting an electrolytic solution into the battery.

2 Description of the Related Art

Unlike primary batteries incapable of charging, secondary batteries that are capable of charging and discharging, are widely used in advanced electronic devices such as mobile phones, notebook type computers, camcorders and the like. In particular, lithium secondary batteries are being rapidly developed because they have a service life 3 times longer than nickel-cadmium batteries or nickel metal hydride batteries which operate at 3.6 V and are widely used as the power source for electronic devices, and have high-energy density per unit weight.

Such lithium secondary batteries use lithium oxide as a positive electrode active material and a carbon material as a negative electrode active material. According to the kind of electrolyte used, lithium secondary batteries are generally classified into lithium ion batteries using a liquid electrolyte and lithium polymer batteries using a solid electrolyte. Also, lithium secondary batteries are manufactured in various shapes, for example, cylindrical, rectangular or pouchy shape.

In the conventional cap plate, since there is no space to install a safety vent that ruptures due to an increase in internal pressure, there is a design limit in installing the safety vent in the cap plate.

Korean Patent Publication No. 2000-51285 discloses a secondary battery in which an electrode tab is welded to the opposite side of an electrolytic solution inlet in view of an electrode terminal pin, which is different from the above-described conventional secondary battery in that only one electrode tab is welded to a cap assembly and the other electrode tab is welded to the can. However, the disclosed secondary battery also has a limit in view of injection efficiency of an electrolytic solution because the electrolytic solution inlet is simply a perforated hole.

SUMMARY OF THE INVENTION

Accordingly, it is an object of the present invention to provide a secondary battery which can improve injection efficiency of an electrolytic solution.

Also, it is an object of the present invention to provide a secondary battery which can promote injection of an electrolytic solution even if there is interference between an electrode tab and an electrolytic solution inlet.

In accordance with an aspect of the present invention, there is provided a secondary battery comprising an electrode unit having a first electrode plate, a second electrode plate, a separator interposed therebetween, and first and second electrode tabs respectively extending from the first and second electrode plates, a can adapted to accommodate the electrode unit, and a cap plate adapted to seal the can and having an electrolytic solution inlet, wherein the electrolytic solution inlet has an area on one surface of the cap plate different from that on another surface of the cap plate.

In accordance with another aspect of the present invention, there is provided a secondary battery comprising an electrode unit having a first electrode plate, a second electrode plate, a separator interposed therebetween, and first and second electrode tabs respectively extending from the first and second electrode plates, a can adapted to accommodate the electrode unit and an electrolytic solution, a cap plate adapted to seal the can, a terminal pin connected so as to be insulated from the cap plate and adapted to be electrically connected to the first electrode tab, and an insulating plate arranged on the inner surface of the cap plate and extending in one direction of the cap plate to insulate the terminal pin from the cap plate, wherein the second electrode tab is adapted to be welded to a position opposite to the electrolytic solution inlet with respect to the terminal pin of the cap plate.

In accordance with still another aspect of the present invention, there is provided a secondary battery comprising an electrode unit having a first electrode plate, a second electrode plate, a separator interposed therebetween, and first and second electrode tabs respectively extending from the first and second electrode plates, a can adapted to accommodate the electrode unit and an electrolytic solution, a cap plate adapted to seal the can and having an electrolytic solution inlet, a terminal pin connected to be insulated from the cap plate and adapted to be electrically connected to the first electrode tab, and an insulating plate arranged on the inner surface of the cap plate and extending in one direction of the cap plate to insulate the terminal pin from the cap plate, wherein the electrolytic solution inlet is arranged to overlap the insulating plate, and wherein an injection hole corresponding to the electrolytic solution inlet is arranged in the insulating plate.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION

Figure 1:
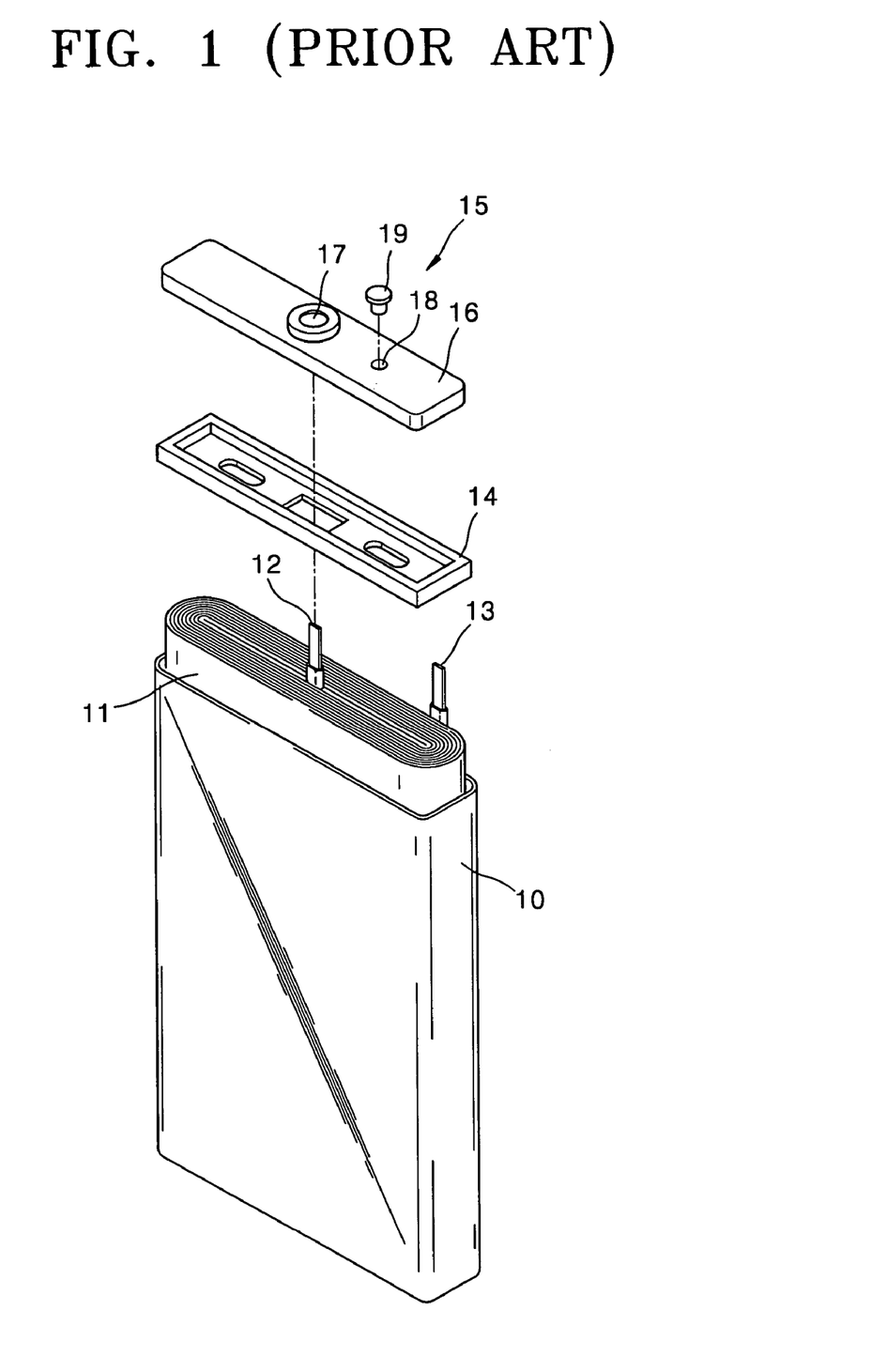
FIG. 1 is an exploded perspective view of a conventional rectangular secondary battery.

FIG. 1 shows a rectangular secondary battery employing a jelly-roll type electrode unit. As shown in FIG. 1, in the rectangular secondary battery, an electrode unit 11 and an electrolyte are accommodated inside a rectangular can 10 having an opening at one end thereof. The electrode unit 11 of a jelly-roll type is formed by isolating a positive electrode plate coated with a positive electrode compound material containing a positive electrode active material from a negative electrode plate coated with a negative electrode compound material containing a negative active material by a separator, and winding the positive electrode plate, the negative electrode plate and the separator into a jelly roll. A positive electrode tab 13 and a negative electrode tab 12 connected to the positive electrode plate and the negative electrode plate, respectively, are formed at either side of the electrode unit 11.

The electrode unit 11 is accommodated in the can 10, a predetermined protection case 14 is inserted into the can 10 and the cap assembly 15 is sealed to the can 10. The cap assembly 15 includes a cap plate 16 encapsulating an opening of the can 10, and a terminal pin 17 connected to penetrate the cap plate 16, insulated from the cap plate 16 and electrically connected to the negative electrode tab 12.

In the secondary battery, a cap plate 16 is assembled in the can 10, an electrolytic solution is injected into the can 10 through an electrolytic solution inlet 18 formed at the cap plate 16 and the inlet 18 is sealed with a plug 19.

The positive electrode tab 13 of the electrode unit 11 that is not connected to the terminal pin 17 is welded to the bottom surface of the cap plate 16, generally to a position between the terminal pin 17 and the electrolytic solution inlet 18. This is because a terminal plate (not shown) for easily obtaining a welding position of the negative electrode tab 12, extends opposite to the electrolytic solution inlet 18 in view of the terminal pin 17.

However, the welding of the positive electrode tab 13 between the terminal pin 17 and the electrolytic solution inlet 18 adversely affects the efficiency of injecting an electrolytic solution.

In other words, since the positive electrode tab 13 is welded to a position between the terminal pin 17 and the electrolytic solution inlet 18, a space margin is insufficient at the welding position of the positive electrode tab 13. Thus, if the positive electrode tab 13 happens to be welded to a position at which the electrolytic solution inlet 18 is interfered with, injection of an electrolytic solution can not be smoothly performed.

Exemplary embodiments of the present invention will now be described in detail with reference to the accompanying drawings.

Figure 2:
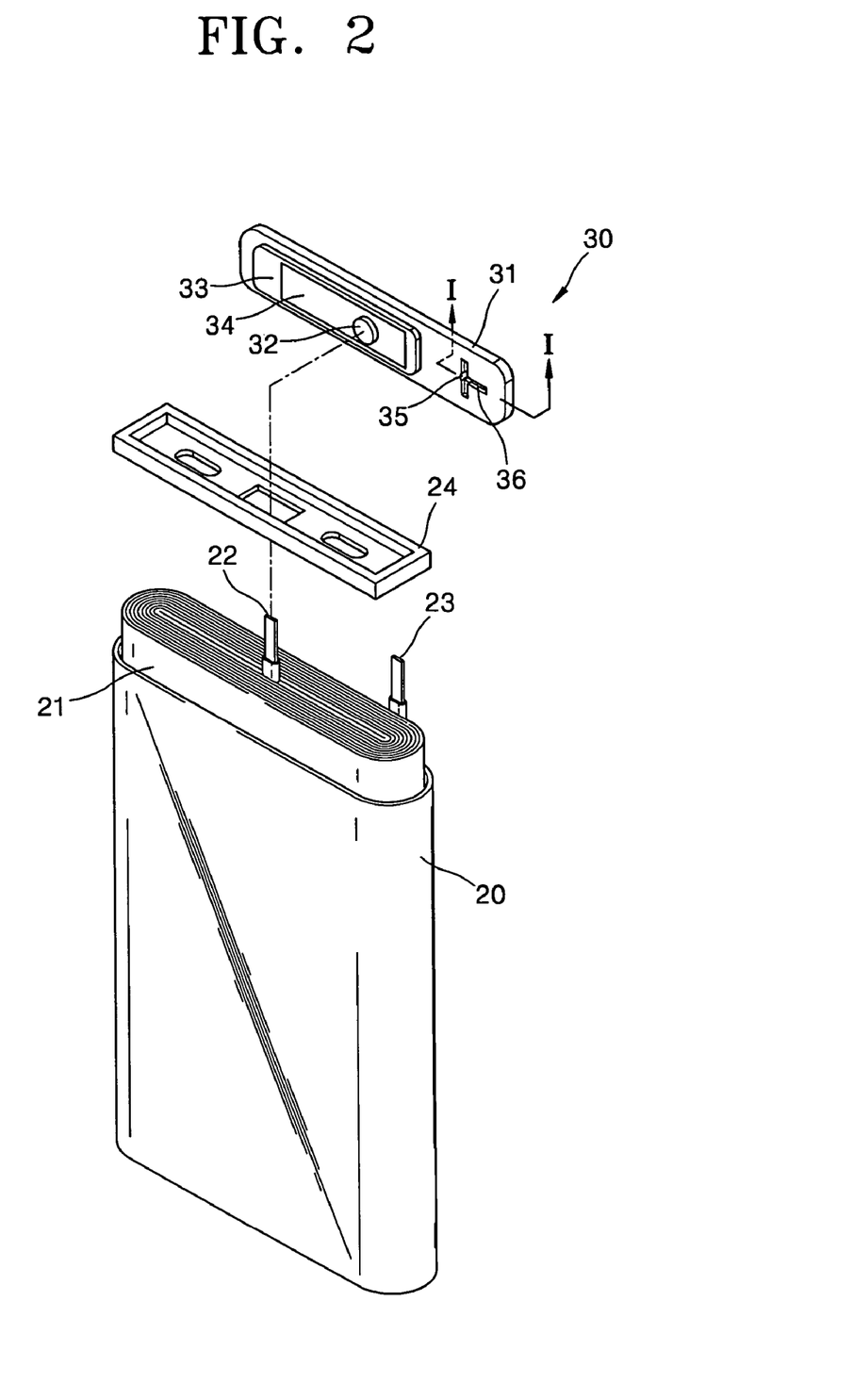
FIG. 2 is an exploded perspective view of a secondary battery according to an embodiment of the present invention.

FIG. 2 is an exploded perspective view of a secondary battery according to an embodiment of the present invention.

Referring to FIG. 2, the secondary battery includes a can 20, a jelly-roll type electrode unit 21 accommodated inside the can 20 and a cap assembly 30 coupled to the upper portion of the can 20.

The can 20 has a substantially rectangular section and is made of a metal, preferably aluminum or an aluminum alloy, serving as a terminal.

The electrode unit 21 accommodated inside the can 20 includes a first electrode plate, a second electrode plate and a separator interposed therebetween, preferably in a jelly-roll configuration. In one embodiment of the present invention, the first electrode plate can be a negative electrode plate and the second electrode plate can be a positive electrode plate, or vice versa.

The negative electrode plate includes a negative electrode collector made of a strip-shaped metal foil. A copper foil can be used as the negative electrode collector.

A negative electrode compound material is coated on at least one plane of the negative electrode collector. The negative electrode compound material can be formed of a mixture including a negative electrode active material made of a carbon material, a binder, a plasticizer, a conductive material and the like.

The positive electrode plate includes a positive electrode collector made of a strip-shaped metal foil. An aluminum foil can be used as the positive electrode collector.

A positive electrode compound material is coated on at least one plane of the positive electrode collector. The positive electrode compound material can be formed of a mixture including a positive electrode active material made of lithium oxide, a binder, a plasticizer, a conductive material and the like.

A separator is installed between one side of the negative electrode plate and one side of the positive electrode plate, forming a laminate. The laminate is wound to form an electrode unit. The separator isolates the positive electrode plate and the negative electrode plate from each other and exchanges active material ions of electrode plates. The separator is preferably long enough to completely isolate electrode plates from each other even when the electrode unit shrinks or expands. An electrode unit having any structure can be applied to the present invention.

A first electrode tab 22 and a second electrode tab 23 are drawn out to an upper portion of the electrode unit 21. The first electrode tab 22 and the second electrode tab 23 are respectively welded to the first electrode plate and the second electrode plate. Preferably, the first electrode tab 22 can be a negative electrode tab, and the second electrode tab 23 can be a positive electrode tab. The first electrode tab 22 can be formed of nickel or a nickel alloy, and the second electrode tab 23 can be formed of aluminum or an aluminum alloy. Also, although not shown, an insulating tape for preventing a short-circuit between electrode plates can be wrapped where the first and second electrode tabs 22 and 23 protrude outward from the electrode unit 21.

The first and second electrode tabs 22 and 23 of the electrode unit 21 are respectively welded to predetermined portions of the cap assembly 30, which will be described later.

In one embodiment of the present invention, the cap assembly 30 sealing an opening of the can 20 can include a cap plate 31 formed of the same material as the can 20 and a terminal pin 32 penetrating the cap plate 31 so as to be insulated therefrom. The terminal pin 32 is formed to penetrate the cap plate 31 by disposing an insulating tube (not shown). An insulating plate 33 and a terminal plate 34 can be further provided at the bottom of the cap plate 31. In other words, the terminal plate 34 is disposed on the bottom of the cap plate 31 to be connected to the terminal pin 32, and the insulating plate 33 for insulation of the terminal plate 34 is disposed between the terminal plate 34 and the cap plate 31.

The electrode tabs are welded to the cap assembly 30. Preferably, the first electrode tab 22 is welded to the terminal pin 32 or the terminal plate 34 electrically connected to the terminal pin 32, and the second electrode tab 23 is welded to the bottom of the cap plate 31. Alternatively, the second electrode tab 23 can be welded to the bottom of the cap plate 31 opposite to a direction in which the terminal plate 34 extends with respect to the terminal pin 32. The terminal plate 34 can be elongated in either direction from the terminal pin 32 to ensure freedom in selecting a welding position of the first electrode tab 22.

In one embodiment of the present invention, welding of the first and second electrode tabs in such a manner makes the terminal pin 32 and the first electrode plate exert the same polarity, and makes the can 20 and the cap plate 31 exert the same polarity with the second electrode plate.

An insulation case 24 serving as an insulator can be further provided between the cap assembly 30 and the electrode unit 21 for the purpose of preventing electrical disconnection inside the can 20 due to fluctuations of the electrode unit 21.

In the present invention, the cap plate 31 includes an electrolytic solution inlet 35 for injection of an electrolytic solution. The electrolytic solution inlet 35 is configured such that its area sum at one surface of the cap plate 31 is different from that at the other surface of the cap plate 31. In order to promote injection of an electrolytic solution, the area sum of the electrolytic solution inlet 35 at an inner surface of the can is made greater than that at an outer surface of the can.

In one embodiment of the present invention, in order to make the area sum of the electrolytic solution inlet 35 different between at one surface of the cap plate 31 and at the other surface of the cap plate 31, a first channel 36 is formed in the neighborhood of the electrolytic solution inlet 35. The electrolytic solution inlet 35 can be formed by perforating the cap plate 31 to make a predetermined hole. The first channel 36 can be formed on an outer top surface or inner bottom surface of the cap plate by pressing. As shown FIG. 3, it is preferred that the first channel 36 is formed only on the inner bottom surface of the cap plate 31, but the present invention is not limited thereto. As shown in FIG. 4, the first channel 36 can be formed on the outer top surface of the cap plate 31. Although not shown, the first channel 36 can also be formed both on the inner bottom surface of the cap plate 31 and on the outer top surface of the cap plate 31.

Figure 3:
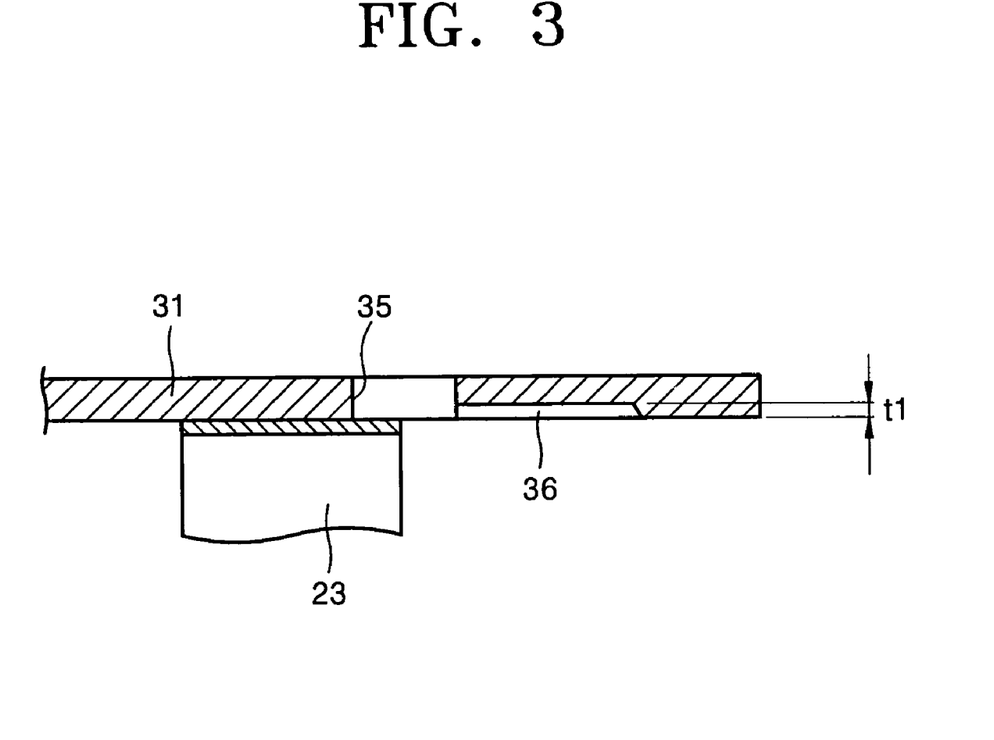
FIG. 3 is a partly enlarged section view of FIG. 2, taken along the line I-I.
Figure 4:
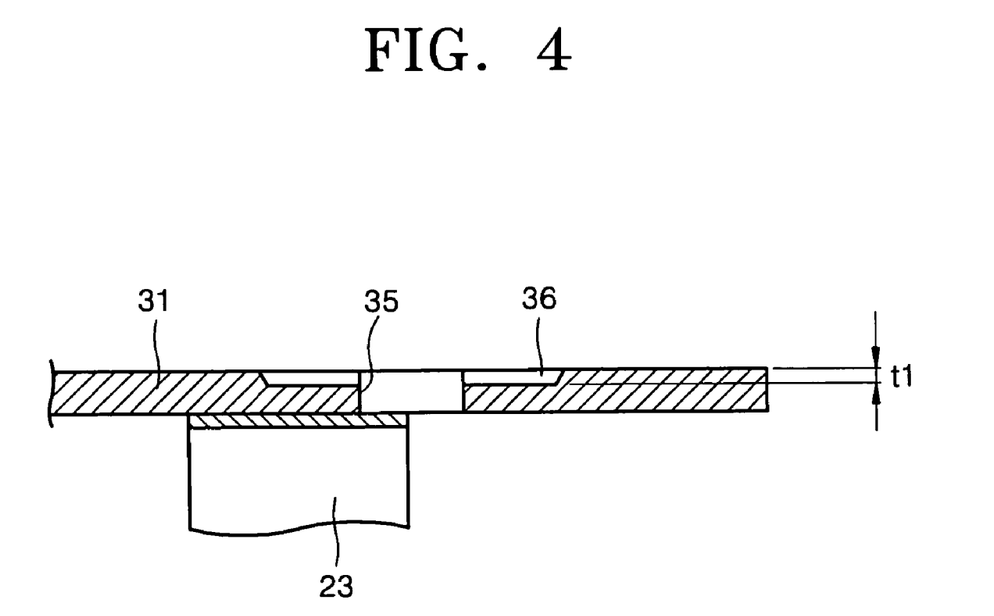
FIG. 4 is a partly enlarged section view illustrating another embodiment of FIG. 2, taken along the line I-I.

As shown in FIG. 3, the first channel 36 is preferably connected to the electrolytic solution inlet 35 at its one end, and is formed in various shapes including linear, circular and spiral shapes. If the first channel 36 is linearly shaped, as shown in FIG. 2, it is preferred that the first channel 36 is spirally disposed around the electrolytic solution inlet 35. If the first channel 36 is formed on the inner bottom surface of the cap plate 31, the first channel 36 is not preferably formed in a direction in which the second electrode tab 23 is welded. This is for preventing poor welding of the second electrode tab 23 due to the first channel 36. The first channel 36 formed on the inner bottom surface and/or outer top surface of the cap plate 31 increases the entrance of the electrolytic solution inlet 35, thereby promoting injection of an electrolytic solution.

As shown in FIGS. 3 and 4, the first channel 36 preferably has a depth t1 of 0.1 to 0.5 mm. If the depth t1 is too small, an improved electrolytic solution injection is difficult to achieve. If the depth t1 is too large, the strength of the cap plate 31 can be impaired.

Figure 5:
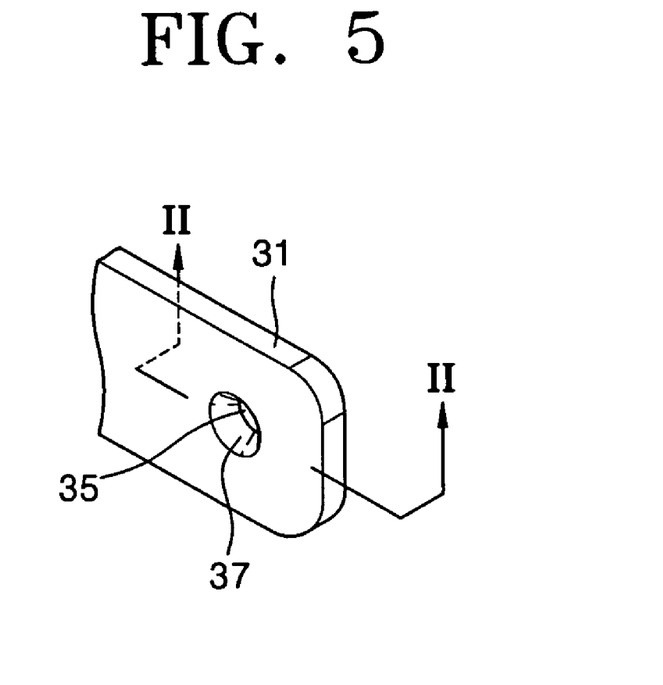
FIG. 5 is a partly enlarged section view of an electrolytic solution inlet according to another embodiment of the present invention.
Figure 6:
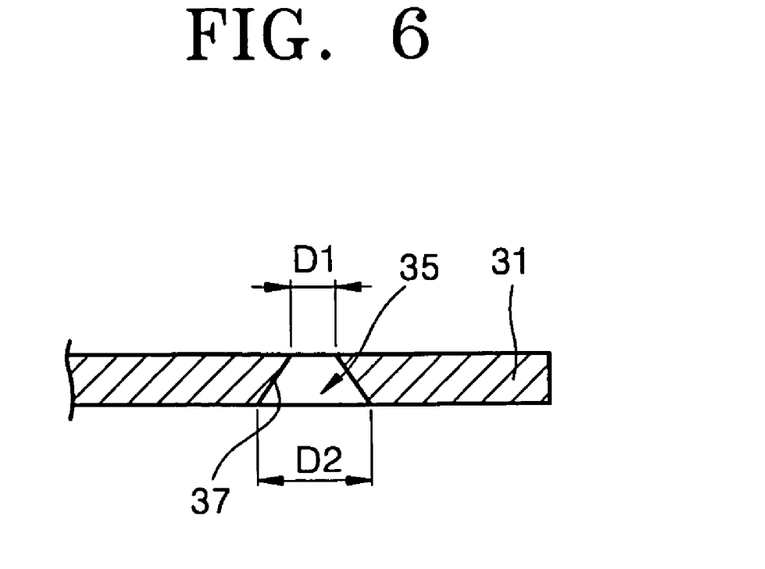
FIG. 6 is a partly enlarged section view of FIG. 5, taken along the line II-II.

As shown in FIGS. 5 and 6, the electrolytic solution inlet 35 can have a sloping cross-section. As shown in FIG. 6, a diameter D2 at the surface facing the inside of the can is larger than a diameter D1 at the surface facing the outside of the can, so that injection of an electrolytic solution can be promoted. The sloping direction is opposite to the direction shown in FIGS. 5 and 6, that is, the electrolytic solution inlet 35 gets wider in a direction facing the outside.

Figure 7:
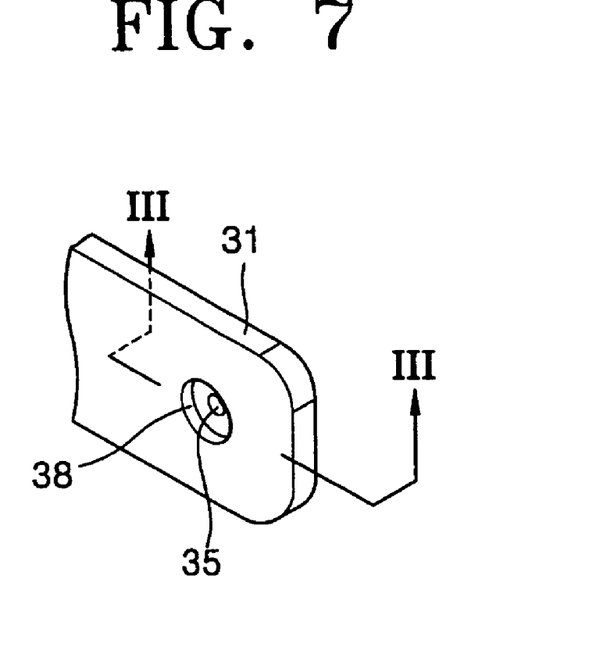
FIG. 7 is a partly enlarged section view of an electrolytic solution inlet according to still another embodiment of the present invention.
Figure 8:
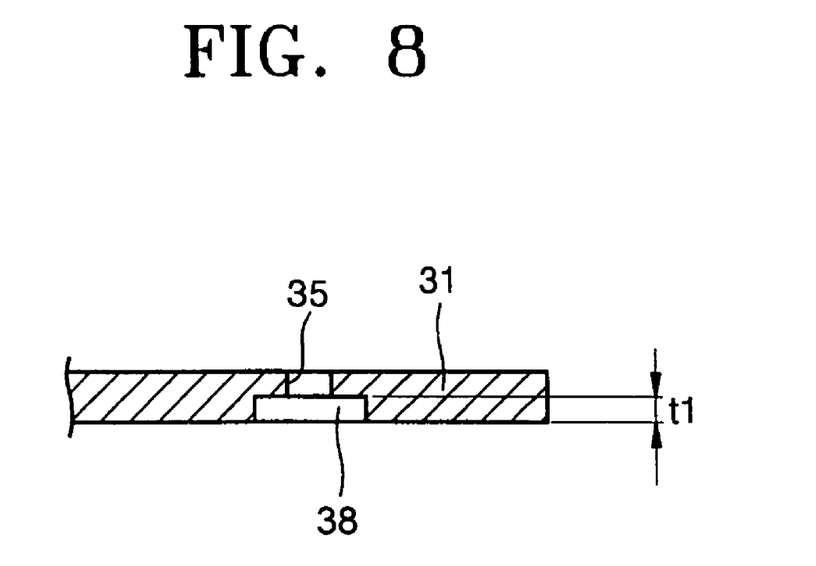
FIG. 8 is a partly enlarged section view of FIG. 7, taken along the line III-III.

As shown in FIGS. 7 and 8, the electrolytic solution inlet 35 can have a stepped portion 38 having a predetermined depth t1. The depth t1 of the stepped portion 38 is preferably in the range of 0.1 to 0.5 mm. The stepped portion 38 is also formed to be wider in a direction facing the outside.

The operation of the secondary battery according to the exemplary embodiments of the present invention will now be described referring to FIGS. 2 and 3.

First, as shown in FIG. 2, the electrode unit 21 is accommodated in the can 20, and the insulation case 24 is inserted into an upper portion of the electrode unit 21. The opening of the can 20 is sealed with the cap assembly 30. The first electrode tab 22 is welded to the terminal pin 32 or the terminal plate 34, and the second electrode tab 23 is welded to a portion between the terminal pin 32 and the electrolytic solution inlet 35. The cap assembly 30 having the first and second electrode tabs 22 and 23 welded thereto is welded to the can 20, thereby sealing the can 20.

After assembling the battery, an electrolytic solution is injected into the battery can through the electrolytic solution inlet 35. Injection of an electrolytic solution is performed in a state in which the inside of the can is evacuated. That is, the electrolytic solution is injected into the can due to a pressure difference between the inside and outside of the can 20.

According to the embodiment of the present invention, as shown in FIG. 3, even when the second electrode tab 23 is welded to a position at which the electrolytic solution inlet 35 is interfered with, the electrolytic solution can be smoothly injected into the can.

Even when the second electrode tab 23 is welded to a position at which it is interfered with by the electrolytic solution inlet 35, as shown in FIG. 3, since the first channel 36 is formed in the neighborhood of the electrolytic solution inlet 35, the electrolytic solution can be smoothly injected into the can 10 through the electrolytic solution inlet 35 via the first channel 36.

This effect can also be exhibited when the first channel 36 is formed on the outer top surface of the cap plate 31, as shown FIG. 4. In other word, the first channel 36 formed on the outer top surface of the cap plate 31 allows the electrolytic solution to be smoothly injected into the can 10 without flowing out along the outer top surface of the cap plate 31.

Although not shown, the first channel 36 can be applied to the case where the second electrode tab 23 is welded to the opposite side of the electrolytic solution inlet 35 with respect to the terminal pin 32. Also, the insulating plate 33 connected to the cap plate 31, and the terminal plate 34 can be employed in various structures in addition to the above-described structure. When the second electrode tab 23 is welded to the opposite side of the electrolytic solution inlet 35 with respect to the terminal pin 32, a safety vent can be further provided opposite to the terminal pin 32 with respect to the second electrode tab 23 of the cap plate 31. The safety vent, which is configured to rupture when the internal pressure of the battery increases so as to be greater than a predetermined level due to a malfunction of the battery, is provided for the purpose of preventing an explosion or a fire in the battery.

Also, the operation and effect of the first channel 36 can be applied to the electrolytic solution inlet 35 having a sloping plane 37, as shown in FIGS. 5 and 6, and to the electrolytic solution inlet 35 having a stepped portion 38, as shown in FIGS. 7 and 8.

Figure 9:
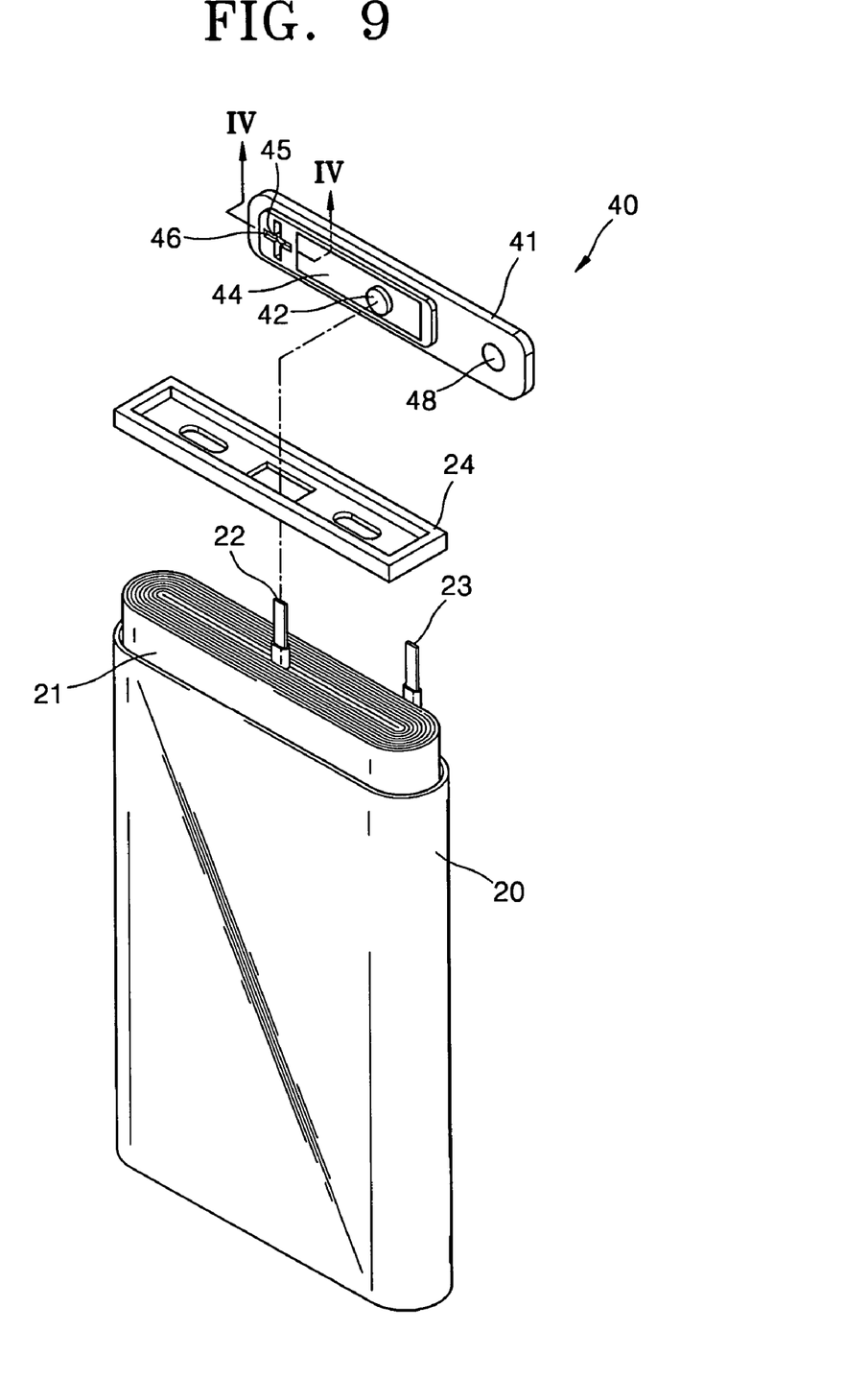
FIG. 9 is an exploded perspective view of a secondary battery according to still another embodiment of the present invention.

FIG. 9 is an exploded perspective view of a secondary battery according to still another embodiment of the present invention. The secondary battery shown in FIG. 9 is the same as that shown in FIG. 2, except for the structure of the cap assembly, which will now be described.

As shown in FIG. 9, according to still another embodiment of the present invention, an electrolytic solution inlet 45 can be formed opposite to a welding position of the second electrode tab 23 with respect to a terminal pin 42.

Figure 10:
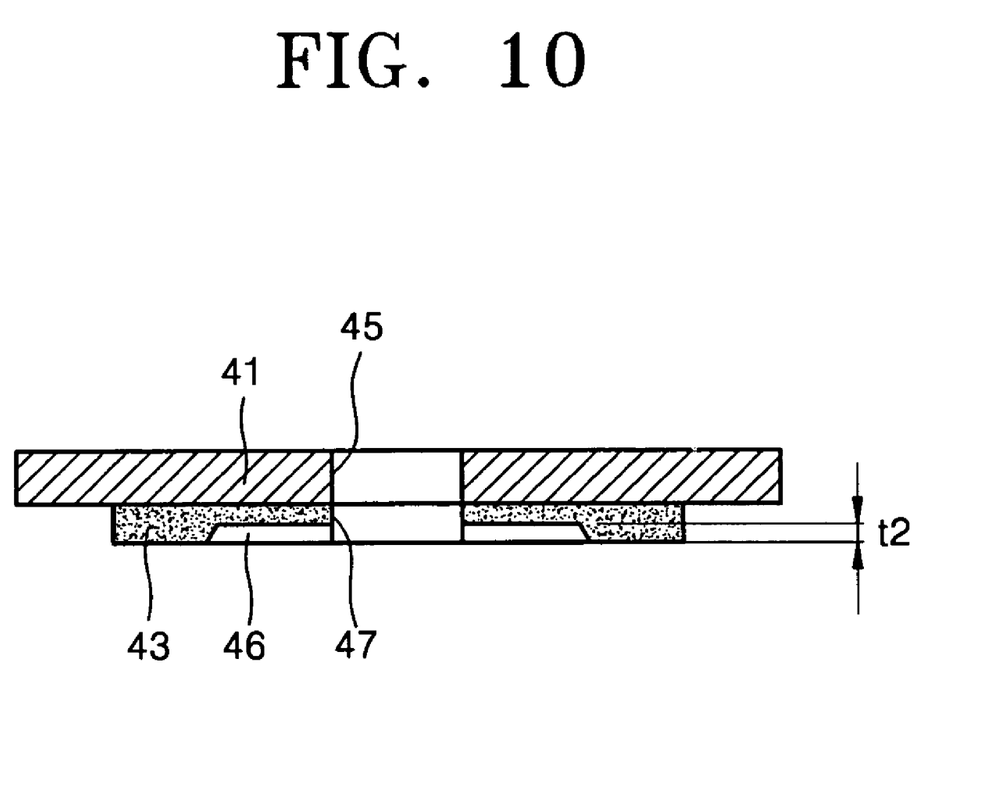
FIG. 10 is a partly enlarged section view of FIG. 9, taken along the line IV-IV.

An insulating plate 43 and a terminal plate 44 are assembled to the terminal pin 42, and the electrolytic solution inlet 45 is disposed to overlap the insulating plate 43. Accordingly, as shown in FIG. 10, an injection hole 47 corresponding to the electrolytic solution inlet 45 is perforated at the insulating plate 43.

Like the electrolytic solution inlets according to the above-described embodiments, the injection hole 47 can be configured such that its area sum at one surface of the insulating plate 43 is different from the area sum at the other surface of the insulating plate 43. Preferably, the injection hole 47 can be configured such that its area sum facing the inside of the battery can is greater than that facing the outside of the battery can.

To this end, a second channel 46 which promotes injection of an electrolytic solution is formed in the neighborhood of the injection hole 47. As shown in FIG. 9, the second channel 46 is preferably connected to the injection hole 47 at its one end, and is formed in various shapes, including linear, circular and spiral shapes.

When the second channel 46 is linearly shaped, as shown in FIG. 9, it is preferred that the second channel 46 is spirally disposed around the injection hole 47. Like the first channel 36, the second channel 46 preferably has a depth t2 of 0.1 to 0.5 mm.

Consequently, the second channel 46 causes the exit of the electrolytic solution inlet 45 to be enlarged, thereby promoting injection of an electrolytic solution.

As described above, when the electrolytic solution inlet 45 is positioned opposite to the welding position of the second electrode tab 23 with respect to the terminal pin 42, freedom in selecting a welding position of the second electrode tab 23 is ensured. Also, as shown in FIG. 9, a safety vent 48 can be more advantageously formed outside a position to which the second electrode tab 23 of the cap plate 41 is welded. As described above, the safety vent 48 is configured to rupture when the internal pressure of the battery increases so as to be greater than a predetermined level due to a malfunction of the battery.

Although not shown, the injection hole 47 can have a sloping cross-section or a stepped portion recessed to a predetermined depth from the inner surface of the insulating plate, like the electrolytic solution inlet. The same effects can be exerted as in the second channel.

As described above, the secondary battery according to the present invention has the following advantages.

First, since the area of the entrance or exit of an electrolytic solution inlet can be increased, an electrolytic solution can be injected more smoothly.

Second, even when an electrode tab is welded such that an electrolytic solution inlet is interfered with to some extent, injection of an electrolytic solution can be smoothly performed.

Third, a space margin of a cap assembly can be increased by ensuring freedom in selecting the injection position of an electrolytic solution, and the welding position of an electrode tab can be advantageously set.

Fourth, a safety vent can be more easily installed at a cap plate.

While this invention has been particularly shown and described with reference to exemplary embodiments thereof, it will be understood by those skilled in the art that various changes in form and details can be made therein without departing from the spirit and scope of the invention as defined by the appended claims.

What is claimed is:

1. A secondary battery, comprising:
   an electrode unit having a first electrode plate, a second electrode plate, a separator interposed therebetween, and first and second electrode tabs respectively extending from the first and second electrode plates;
   a can adapted to accommodate the electrode unit and an electrolytic solution; and
   a cap plate adapted to seal the can, said cap plate being perforated by an electrolytic solution inlet extending from a smaller opening on a first major surface of the cap plate facing an exterior of the secondary battery and through the care plate to a larger opening of the electrolytic solution inlet on a second major surface of the cap plate facing the electrode unit, on opposite sides of the cap plate.

2. The secondary battery of claim 1, further comprising at least one channel adapted to facilitate injection of an electrolytic solution in the neighborhood of the electrolytic solution inlet.

3. The secondary battery of claim 2, wherein one end of the channel is integrated with and connected to the electrolytic solution inlet.

4. The secondary battery of claim 3, wherein the channel is linearly shaped and arranged radially in the neighborhood of the electrolytic solution inlet.

5. The secondary battery of claim 2, wherein the channel has a depth in a range of 0.1 mm to 0.5 mm.

6. The secondary battery of claim 1, wherein the electrolytic solution inlet has a sloping cross-section.

7. The secondary battery of claim 1, wherein the electrolytic solution inlet has a stepped portion recessed to a predetermined depth in the neighborhood of the electrolytic solution inlet.

8. The secondary battery of claim 7, wherein the stepped portion has a depth in a range of 0.1 mm to 0.5 mm.

9. The secondary battery of claim 1, wherein the first electrode tab is electrically connected to a terminal pin which is physically connected to the cap plate and electrically insulated from the cap plate, and the second electrode tab is welded to the cap plate at a position between the terminal pin and the electrolytic solution inlet.

10. The secondary battery of claim 1, with the first electrode tab being electrically connected to a terminal pin which is physically connected to the cap plate and electrically insulated from the cap plate, the second electrode tab being welded to the cap plate at a first position and the terminal pin being disposed between the electrolytic solution inlet and the first position.

11. The secondary battery of claim 10, further comprising a safety vent arranged at a second position, the second electrode tab being disposed between the terminal pin and the second position, and the safety vent being adapted to rupture when the internal pressure of the sealed can increases to a level greater than a predetermined allowed level.

12. A secondary battery, comprising:
   an electrode unit having a first electrode plate, a second electrode plate, a separator interposed therebetween, and first and second electrode tabs respectively extending from the first and second electrode plates;
   a can adapted to encase the electrode unit and an electrolytic solution; a cap plate adapted to seal the can,
   a terminal pin electrically connected to the first electrode tab and physically connected to and electrically insulated from the cap plate;
   an insulating plate provided on a second major surface of the cap plate and extending in a direction along which the cap plate extends and arranged to insulate the terminal pin from the cap plate; and the second electrode tab being welded to the cap plate at a position, the terminal pin being disposed between an electrolytic solution inlet and the second electrode tab, said care plate being perforated by the electrolytic solution inlet having a smaller opening of the electrolytic solution inlet located on a first major surface of the cap plate facing an exterior of the secondary battery and through a larger opening of the electrolytic solution inlet on the second major surface of the cap plate.

13. The secondary battery of claim 12, with the electrolytic solution inlet being arranged to overlap the insulating plate, and the injection hole disposed corresponding to the electrolytic solution inlet arranged in the insulating plate.

14. The secondary battery of claim 13, further comprising at least one channel adapted to facilitate injection of an electrolytic solution in the neighborhood of the injection hole.

15. The secondary battery of claim 14, wherein one end of the channel is connected to the injection hole.

16. The secondary battery of claim 15, wherein the channel is linearly shaped and arranged radially in the neighborhood of the injection hole.

17. The secondary battery of claim 14, wherein the channel has a depth in a range of 0.1 mm to 0.5 mm.

18. The secondary battery of claim 13, wherein the injection hole has a sloping cross-section.

19. The secondary battery of claim 13, wherein a stepped portion recessed to a predetermined depth is arranged in the neighborhood of the injection hole.

20. The secondary battery of claim 19, wherein the stepped portion has a depth in a range of 0.1 mm to 0.5 mm.

21. The secondary battery of claim 12, further comprising a safety vent arranged at a position, the second electrode tab being disposed between the terminal pin and the position, and the safety vent adapted to rupture when the internal pressure of the sealed can increases so as to be greater than a predetermined allowed level.

22. A secondary battery, comprising:
an electrode unit having a first electrode plate, a second electrode plate, a separator interposed therebetween, and first and second electrode tabs respectively extending from the first and second electrode plates;

a can adapted to encase the electrode unit and an electrolytic solution;

a cap plate adapted to seal the can and, said cap plate having an electrolytic solution inlet;

a terminal pin electrically connected to the first electrode tab and physically connected to and electrically insulated from the cap plate;

an insulating plate arranged on a second surface of the cap plate, said insulating plate extending in one direction of the cap plate and insulating the terminal pin from the cap plate; and the electrolytic solution inlet being arranged to overlap the insulating plate, and an injection hole disposed in correspondence with the electrolytic solution inlet, the electrolytic solution inlet being positioned in the insulating plate, said insulating plate being perforated by the electrolytic solution inlet extending between a larger opening of the electrolytic solution inlet located on a first major surface of the insulating plate facing the electrode unit of the secondary battery and through to a smaller opening of the injection hole on a second major surface of the cap plate spaced apart from the electrode unit and facing an exterior of the secondary battery.

23. The secondary battery of claim 22, further comprising at least one channel adapted to facilitate injection of an electrolytic solution in the neighborhood of the injection hole.

24. The secondary battery of claim 23, wherein one end of the channel is connected to the injection hole.

25. The secondary battery of claim 24, wherein the channel is linearly shaped and arranged radially in the neighborhood of the injection.

26. The secondary battery of claim 23, wherein the channel has a depth in a range of 0.1 mm to 0.5 mm.

27. The secondary battery of claim 22, wherein the injection hole has a sloping cross-section.

28. The secondary battery of claim 22, wherein a stepped portion recessed to a predetermined depth is arranged in the neighborhood of the injection hole.

29. The secondary battery of claim 28, wherein the stepped portion has a depth in a range of 0.1 mm to 0.5 mm.

* * * * *

UNITED STATES PATENT AND TRADEMARK OFFICE
CERTIFICATE OF CORRECTION

| | | |
|---|---|---|
| PATENT NO. | : 7,662,511 B2 | Page 1 of 1 |
| APPLICATION NO. | : 10/791854 | |
| DATED | : February 16, 2010 | |
| INVENTOR(S) | : Han et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1704 days.

Signed and Sealed this

Thirtieth Day of November, 2010

David J. Kappos
*Director of the United States Patent and Trademark Office*